July 21, 1936.  M. KÖHLER, GEB. HAIN  2,047,970
BEER COOLING APPARATUS
Filed April 2, 1934
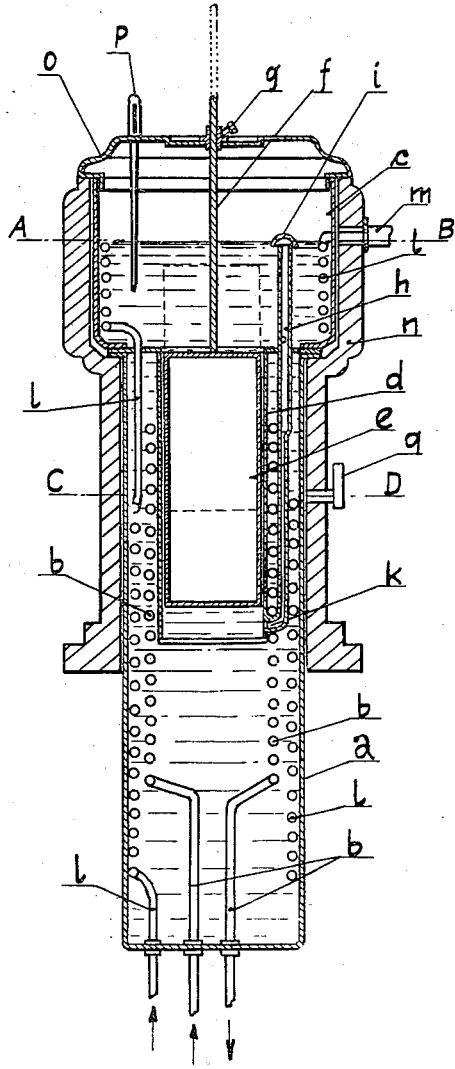
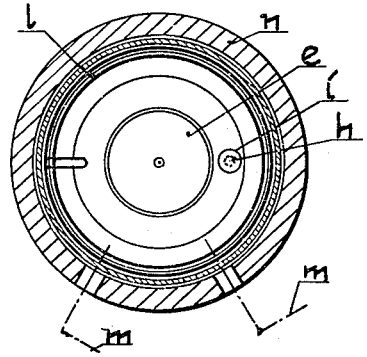
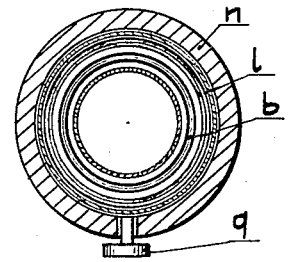
M. Köhler
INVENTOR
By: Glascock Downing & Seebold
Attys.

Patented July 21, 1936

2,047,970

UNITED STATES PATENT OFFICE 2,047,970

BEER COOLING APPARATUS

Martha Köhler, geb. Hain, Landsberg/Warthe, Germany

Application April 2, 1934, Serial No. 718,728
In Germany April 1, 1933

1 Claim. (Cl. 62—141)

(Granted under the provisions of sec. 14, act of
March 2, 1927; 357 O. G. 5)

This invention relates to a beer cooling apparatus in which the beer after being cooled by a cold storage vessel is after-tempered in an equalizing vessel. The invention consists in this, that the deeply cooled cooling liquid in the cooling vessel is adapted to be forced by means of a slidable piston into the equalizing vessel disposed above it, where it enters at the uppermost liquid level, so that through this cold liquid an immediate reduction in the temperature in the equalizing vessel is brought about, the piston also transmitting, according to the height to which it is set, cold from the lower cold storage vessel into the upper equalizing vessel. By this means the temperature in the equalizing vessel can be regulated corresponding to the variations in the rate of dispensing. The object of the invention is to provide an arrangement which enables the beer or similar beverage to be correctly after-tempered in spite of fluctuations in the rate of dispensing.

The accompanying drawing shows a constructional example of the arrangement according to the invention, Fig. 1 being a vertical section through the cooling apparatus.

Fig. 2 a cross-section on line A—B and

Fig. 3 a cross-section on line C—D.

The preliminary cooler proper is formed by a vessel $a$ in which the evaporators or brine tubes $b$ coming from the compressor or other refrigerating arrangement are housed.

Above this vessel is a second vessel $c$ which is in communication with a cylinder $d$ extending down into the vessel $a$ with interposed rings of insulation. In the cylinder $d$ is a float piston $e$ provided at the top with a bar $f$ which is led through the cover $o$ disposed above the equalizing vessel $c$ and is adapted to be fixed at any desired height by means of a set screw $g$. Near the bottom of the cylinder $d$ is a lateral opening $k$ from which a pipe $h$ extends upwards into the vessel $c$, which is provided where the cooling liquid is to reach its highest level with a baffle cap $i$ which is open only downwards. The pipe $h$ and the top end surface of the piston $e$ and the bar $f$ may be insulated as far as they extend into the vessel $c$ for preventing an undesired transmission of cold.

In the vessel $a$ the beer coils $l$ coming from the barrel rise in convolutions till they reach right up into the equalizing vessel $c$ and lead directly to the taps, up to the level of which the cooling liquid level in the vessel $c$ also reaches.

The vessels are provided with a casing $n$ in a known manner, which is placed on the bar counter. Two thermometers $p$ and $q$ indicate the temperatures in the cold storage vessel $a$ and in the equalizing vessel $c$.

The apparatus operates in the following manner:

By depressing the piston $e$ by means of the bar $f$ the specifically heavy cold liquid which is in the cylinder $d$ below the piston is forced up through the pipe $h$ and floods over the liquid in the equalizing vessel $c$, thereby immediately cooling down the latter. As soon as the bar $f$ is released the piston $e$ will, owing to its natural buoyancy, rise in the vessel $c$ (position indicated by broken lines in Fig. 1) and transmit, through its side wall which is now laved by the cooling liquid of the equalizing vessel, the cold from the cold storage vessel $a$ to the vessel $c$, in accordance with the height to which it is set in the vessel $c$. When the piston $e$ is pushed right down, the cold transmission through the piston ceases, as all the parts contacting with the upper cooling liquid are insulated. Any cold still radiated is equalized by the heat radiation taking place through the non-insulated cover $o$.

The bar $f$ is provided with a scale, on which the adjustment of the piston $e$ can be read off through the non-insulated cover $o$.

A beer cooling apparatus comprising an equalizing vessel, a cooling vessel, a cylinder suspended in the cooling vessel and insulated with respect to the equalizing vessel, a piston which is insulated at its upper end surface slidable in the said cylinder, a delivery pipe leading from the lower end of the cylinder to the equalizing vessel and terminating at the highest liquid level in the said vessel, a tap at the same level, a baffle cap which opens downwards mounted on the top end of the delivery pipe, a cover for the cooling apparatus, a graduated bar extending from the top of the piston through the said cover and means for fixing the bar at different heights.

MARTHA KÖHLER GEB. HAIN.